(12) United States Patent
Cervini

(10) Patent No.: US 7,716,455 B2
(45) Date of Patent: May 11, 2010

(54) PROCESSOR WITH AUTOMATIC SCHEDULING OF OPERATIONS

(75) Inventor: Stefano Cervini, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 967 days.

(21) Appl. No.: 11/003,248

(22) Filed: Dec. 3, 2004

(65) Prior Publication Data

US 2006/0149929 A1    Jul. 6, 2006

(51) Int. Cl.
*G06F 9/00* (2006.01)
(52) U.S. Cl. ........................... 712/201; 712/217
(58) Field of Classification Search ............... 712/217, 712/201
See application file for complete search history.

(56) References Cited

U.S. PATENT DOCUMENTS 5,241,635 A * 8/1993 Papadopoulos et al. ..... 712/201

OTHER PUBLICATIONS

"Dataflow Machine Architecture"; Veen; 1986; ACM.*

* cited by examiner

*Primary Examiner*—Alford W Kindred
*Assistant Examiner*—Benjamin P Geib
(74) *Attorney, Agent, or Firm*—Lisa K. Jorgenson; James H. Morris

(57) ABSTRACT

A high speed processor. The processor includes terminals that each execute a subset of the instruction set. In at least one of the terminals, the instructions are executed in an order determined by data flow. Instructions are loaded into the terminal in pages. A notation is made when an operand for an instruction is generated by another instruction. When operands for an instruction are available, that instruction is a "ready" instruction. A ready instruction is selected in each cycle and executed. To allow data to be transmitted between terminals, each terminal is provided with a receive station, such that data generated in one terminal may be transmitted to another terminal for use as an operand in that terminal. In one embodiment, one terminal is an arithmetic terminal, executing arithmetic operations such as addition, multiplication and division. The processor has a second terminal, which contains functional logic to execute all other instructions in the instruction set. The invention is useful for arithmetic intensive applications, such as graphic processors.

36 Claims, 7 Drawing Sheets

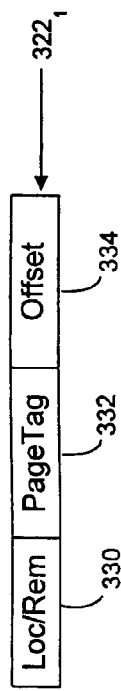
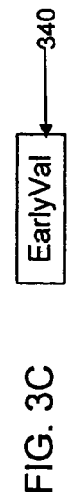
FIG. 3A  FIG. 3B  FIG. 3C  FIG. 3D  FIG. 3E

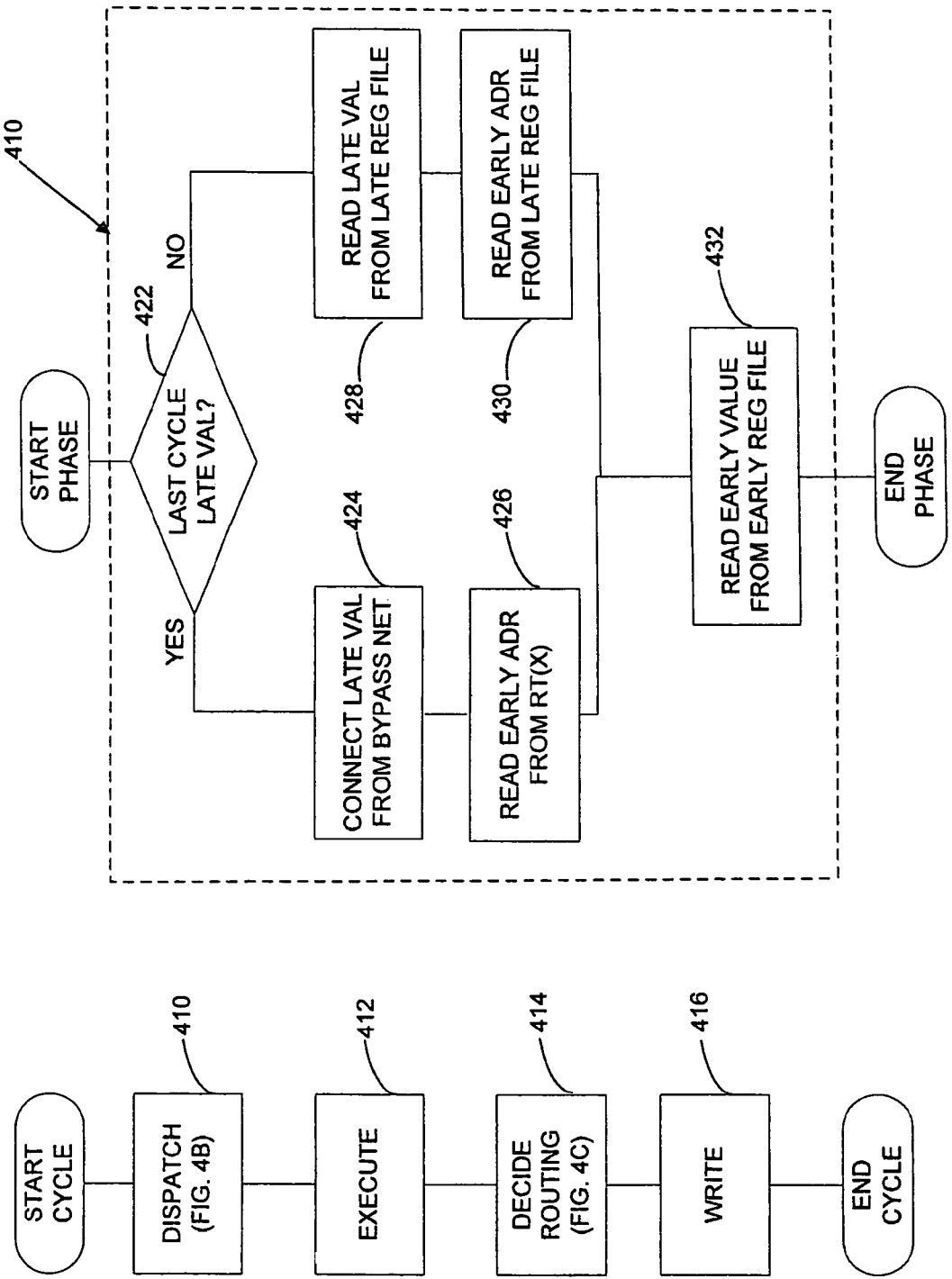

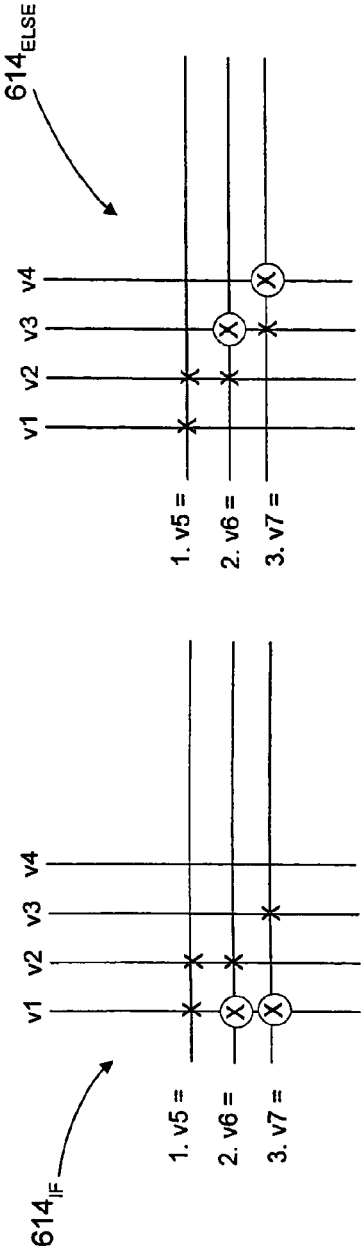
FIG. 6A
FIG. 6B
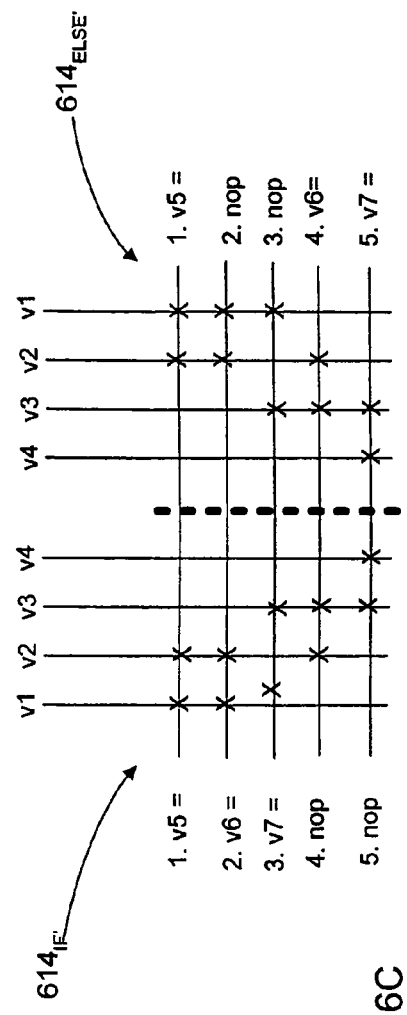
FIG. 6C
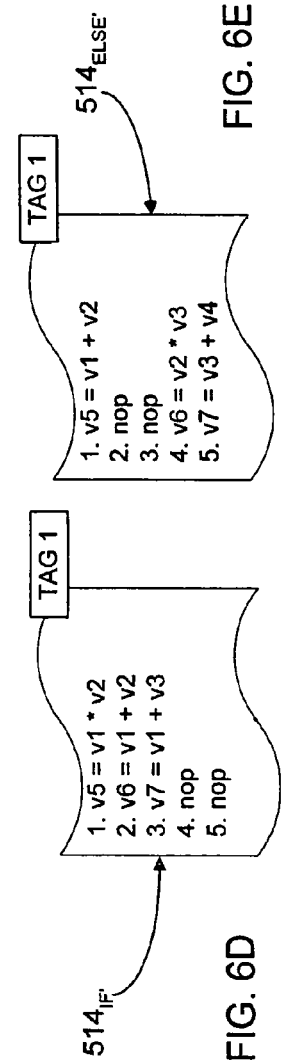
FIG. 6D
FIG. 6E

PROCESSOR WITH AUTOMATIC SCHEDULING OF OPERATIONS

BACKGROUND OF INVENTION

1. Field of Invention

This invention relates generally to computer processors and more particularly to processor architectures.

2. Discussion of Related Art

Processors are widely used in electronic systems. The processor may be constructed as an independent semiconductor chip or may be a core implemented as part of the semiconductor chip that contains other functions.

Many processors are general purpose processors. For example, desk top computers are built around general purpose processors. General purpose processors execute a relatively large instruction set, allowing them to be programmed to perform many types of operations. Typically, the instruction set for a general purpose processor will include arithmetic operations, data manipulation operations and control flow operations.

Special purpose processors are also used in many applications. Special purpose processors are often customized to efficiently execute a small instruction set. The instruction set for a special purpose processor is selected to allow efficient execution of operations most commonly needed in the application for which the special purpose processor is designed. For example, arithmetic coprocessors are often specialized to efficiently perform arithmetic operations and graphic accelerators are specialized to perform operations frequently used to create three dimensional images.

One approach for designing processors is called "clustering." In clustering, the processor hardware is partitioned. Each partition has the ability to execute all of the instructions in the processor instruction set.

It would be desirable to have an improved processor architecture.

SUMMARY OF INVENTION

In one aspect, the invention relates to a method of operating a processor to execute a plurality of instructions, each instruction operating on at least one operand associated with the instruction. The method comprises a) executing a first instruction in the plurality of instructions to generate a first result; b) making the first result available to at least one other instruction in of the plurality of instructions requiring the result as an operand; c) selecting a second instruction based on whether the at least one operand associated with the instruction has been made available to the instruction; and d) executing the second instruction.

In another aspect, the invention relates to a method of operating a processor to execute a plurality of instructions, each instruction having at least a first and a last operand associated therewith. The method comprises: a) loading a memory structure with the plurality of instructions; b) applying a plurality of operands to a functional unit based on a first instruction of the plurality of instructions to generate a result; c) identifying a second instruction having at least a first and a last operand to be associated therewith and requiring the result as an operand; d) when the result is the first operand to be associated with the second instruction, storing the result in a memory structure in a first memory location and associating the first memory location with the second instruction; and e) when the result is the last operand to be associated with the second instruction, storing the result in a second memory location in a memory structure and associating the first memory location with the second memory location.

In a further aspect, the invention relates to a method of operating a processor of the type having: (i) functional logic having inputs, the functional logic producing a result based on operands applied to the inputs; (ii) operand storage memory; (iii) an instruction store; and (iv) a transfer memory. The method comprises a) loading into the instruction store a plurality of instructions having a first tag associated therewith, each instruction representative of an expression and containing an indication of a subsequent instruction that uses the result produced upon evaluation of the expression as an operand; b) evaluating, with the functional logic, an expression based on a first instruction in the instruction store to generate a first result; c) using the indication of a subsequent instruction loaded into the instruction store as part of the first instruction to select a destination for the result. The destination is at least one of the operand storage memory, the transfer memory and an input of the functional logic and the indication of the subsequent expression includes a subsequent expression tag and selecting a destination comprises selecting a destination in part based on the tag for the subsequent expression and the first tag.

In a further aspect, the invention relates to a computer readable medium having stored thereon on a data structure comprising a plurality of entries. Each entry represents an expression to be evaluated by functional logic to produce a result, and each entry comprises a first field indicating an entry in the data structure representing a first expression that requires the result as an operand.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 3A is a sketch representing a data structure used to create a routing table;

FIG. 3B is a sketch showing in greater detail the structure of a next expression entry in the routing table of FIG. 3A;

FIG. 3C is a sketch of the data structure of one entry in an early register file;

FIG. 3D is a sketch of the data structure of one entry in a late register file;

FIG. 3E is a sketch of the data structure of one entry in a receive station;

FIG. 4A is a flow chart of one cycle of operation of the terminal of FIG. 2;

FIG. 4B is a flow chart showing in greater detail the dispatch phase of FIG. 4A;

FIGS. 6A and 6B are sketches useful in understanding a problem that can arise in routing data to the conditional pages shown in FIG. 5;

FIG. 6C is a sketch useful in understanding the use of NOP instructions to remap instructions to conditional pages to avoid the problem illustrated by FIGS. 6A and 6B; and FIGS. 6D and 6E are sketches useful in understanding conditional pages formed according to the remapping illustrated in FIG. 6C.

DETAILED DESCRIPTION

Figure 1:
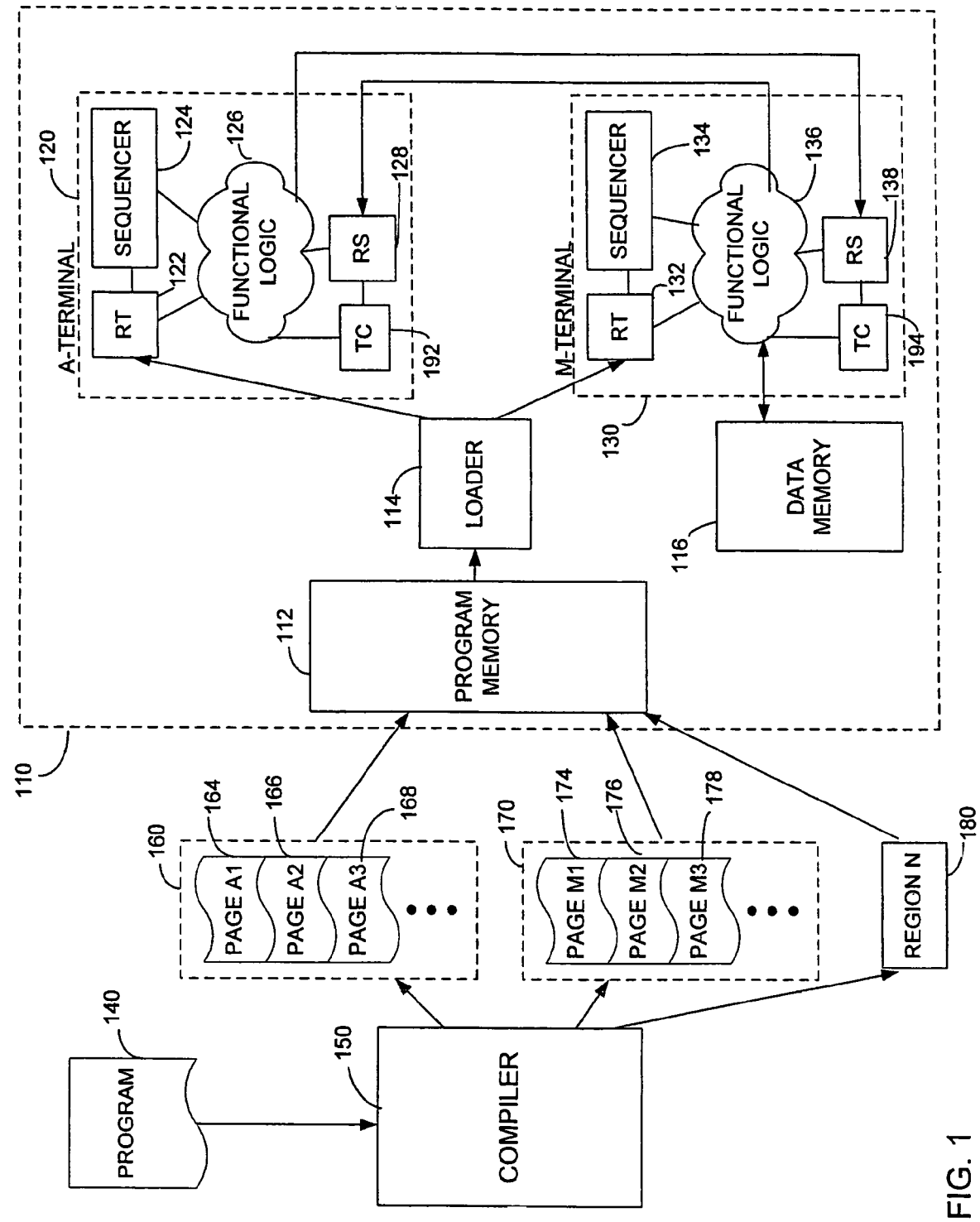
FIG. 1 is a block diagram of a system employing a processor according to the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The following describes a new processor architecture and a method of operating a processor to provide automatic operation scheduling. The new architecture is illustrated with a processor designed to accelerate programs for special purpose applications, such as execution of arithmetic intensive algorithms. Such processors may be used in many applications. In the example herein, the processor may be employed in a high-end computer graphics chip.

The novel architecture and scheduling process will be described using as an example embodiment the processor system of FIG. 1. Processor system 110 includes a program memory 112. As in a traditional computer, program memory 112 stores digital codes that describe the operations to be performed by the processor system 110. The digital codes and program memory 112 also indicate the operands to be used in executing each operation.

However, unlike a traditional digital computer, operations need not be executed in the order stored in program memory 112. Rather, processing system 112 includes a scheduling system that schedules "ready" operations. A ready operation is an operation for which the operands needed to execute the instruction are available. In further contrast to a traditional digital processor, an instruction executing on processor system 110 can identify subsequent instructions, sometimes called "child instructions," that use the results of that instruction. Data is propagated to the child instructions, meaning that the information is routed or stored in such a way that it may be readily used in executing the child instruction. In this example, operands for instructions are identified when instructions generating those operands are executed rather than when instructions using those operands are fetched for execution. While not being bound by any particular theory, it is believed that in many classes of problems solved with digital processors, there is a tight coupling between operations. Such applications are likely to include groups of instructions in which the result of one instruction is used as an operand for one or more subsequent instructions. The described architecture is well suited for these applications because it quickly propagates results from one instruction to a subsequent one. Because instructions are executed when "ready," execution is efficient.

Referring to the example embodiment of FIG. 1, the program controlling processor system 110 is stored in program memory 112 as a series of pages. Each page includes a group of instructions. As described in greater detail below, pages may be created to allow results generated by one instruction to be easily propagated to one or more child instructions. Pages are loaded from program memory 112 into terminals 120 and 130 by a loader 114.

Each terminal, such as 120 and 130, is a circuit that executes a subset of the instruction set for processor system 110. In the embodiment pictured in FIG. 1, processor system 110 is a special purpose processor geared towards computation intensive applications, such as a graphics accelerator. In this embodiment, terminal 120 is an arithmetic terminal. Arithmetic terminal 120 executes arithmetic operations such as addition and multiplication. Terminal 130 is here referred to as the main terminal. Main terminal 130 executes the remainder of the operations performed by processor system 110. In this embodiment, two terminals are shown. However, any number of terminals may be employed in a processor system. For example, the instructions that are executed by main terminal 130 could be subdivided into further groups, with each group being executed in a different terminal.

Arithmetic terminal 120 includes a routing table 122, sequencer 124, functional logic 126, a receive station 128, and transfer control logic 192. Routing table 122 includes a memory structure that stores a page received from loader 114. In addition to storing information loaded from program memory 112, fields within routing table 122 may store information generated as instructions in the page are executed or as the operands are propagated to instructions in the page. Information within routing table 122 specifies the operation to be performed as each instruction is executed. Information within routing table 122 is also used to determine the routing of data so that operands may be propagated to child instructions.

Functional logic 126 contains circuitry that may perform operations as indicated by the instructions stored in routing table 122. In this example, instructions contain expressions that are evaluated by functional logic 126. For the specific example in which terminal 120 is an arithmetic terminal, these expressions are arithmetic expressions.

The results of evaluating expressions within functional logic 126 are routed to locations within processor system 110 based on how those results are used in child instructions. For example, a result may be stored within functional logic 126 to evaluate further expressions or may be stored within terminal 120 in receive station 128. When the result is used in an instruction executed by another terminal, the results may be transmitted to that terminal. To facilitate transmission of data to terminal 130, a data path is provided between functional logic 126 and receive station 138 in terminal 130. If additional terminals are present in the system, those terminals may also have similar receive stations with similar data paths to them.

Terminal 120 is provided with a corresponding receive station 128. It may receive results of operations executed in terminal 130 that are used as operands for instructions executed in terminal 120. As part of this function, receive station 128 buffers information from terminal 130 until functional logic 126 is ready for that data. In the described embodiments, functional logic 126 has limited storage capacity. Processor system 110 is controlled so that functional logic 126 stores only data values used as operands of instructions in the page currently loaded in routing table 122. Data generated by terminal 130 for use in executing an instruction on a page that is not yet loaded into routing table 122 is buffered in receive station 128 until that page is loaded into routing table 122. Upon loading of a new page into routing table 122, transfer control logic 192 transfers operands for that page held in receive station 128 to functional logic 126.

Receive station 128 may be used to similarly buffer results generated within functional logic 126 when those results are to be used as operands for instructions in pages not then loaded in routing table 122. When generated, those results are stored in receive station 128. The data may be subsequently transferred to functional logic 126 by transfer control logic 192 while the page containing the destination instruction is loaded in routing table 122.

Receive station 128 may also be used as an overflow-type buffer for functional logic 126. Even when results generated by functional logic 126 are to be used as operands for instructions loaded in routing table 122, limitations on hardware components in functional logic 126 may preclude immediate storage of those results in functional logic 126. For example, functional logic 126 may include memory that has a limited number of write ports. If results generated in one cycle need to be written to more locations than there are write ports, receive station 128 may be used to temporarily store those values until they can be transferred to functional logic 126.

Information stored in routing table 122 is used in determining the destination for each result computed by functional logic 126. Each instruction includes information that identifies its child instructions. That information is sufficient to identify whether the child instruction is contained within the same page as the instruction generating the result, is contained in a page to be subsequently loaded in the same terminal or is contained in a page that will be executed in a different terminal. This information can be used to identify the routing for the result of each instruction. It is possible that the results of an instruction will be used as an operand in multiple subsequent instructions. Therefore, each result may be routed to one or more locations.

Control circuitry is used to provide for the appropriate flow of data and execution of instructions. Here sequencer 124 and transfer control logic 192 are used as an example of control circuits. Sequencer 124 controls the flow of data so that operands are made available for execution of instructions in the page stored in routing table 122. Sequencer 124 also selects "ready" instructions and controls execution of those instructions. It then generates routing signals to propagate the results of those instructions as appropriate.

Transfer control logic 192 also performs control functions. In the illustrated embodiment, transfer control logic 192 moves information from receive station 128 to functional logic 126. Other control logic may be used to perform other operations. Such control operations may be executed synchronously or asynchronously with control functions performed by sequencer 124 and transfer control logic 192.

Terminal 130 is shown in the example of FIG. 1 to have the same structure as terminal 120. It includes a routing table 132, sequencer 134, functional logic 136, receive station 138 and transfer control logic 194. These components may be constructed generally in the same way as the corresponding components in terminal 120. These components may function together to generate results within functional logic 136 by executing instructions stored in routing table 132. The results of executing each instruction may be routed to one or more destinations based on information in routing table 132 identifying child instructions. Results may be stored within functional logic 136 or within receive station 138. Where results of instructions executed in functional logic 136 are used within terminal 120, those results may be passed to receive station 128.

In the example of FIG. 1, processor system 110 contains two terminals 120 and 130. Terminal 120 is an arithmetic terminal and functional logic 126 evaluates arithmetic expressions to produce results. In contrast, terminal 130 executes other instructions such as may be performed by a traditional processor system. Such instructions may include data manipulation instructions or any arithmetic operation that terminal 120 is not constructed to execute. In some instances, it may be desirable to design terminal 130 to also perform arithmetic operations performed by terminal 120.

In the example of FIG. 1, terminal 130 is shown to be connected to data memory 116. Data manipulation instructions executed by terminal 130 may include storing or retrieving information from data memory 116. Functional logic 136 may be connected to other components within processor system 110 to facilitate execution of instructions within terminal 130. However, for simplicity, such additional components are not shown.

FIG. 1 shows the context in which processor system 110 may be programmed. Program 140 may be a program written either by a human user or generated in an automatic or a semi-automatic fashion.

Program 140 is applied to compiler 150. Compiler 150 may be a software program executing on a computer work station (not shown) providing a development environment. Compiler 150 generates pages of instructions that may be loaded into routing tables such as 122 and 132. Here, pages 164, 166, and 168 contain instructions to be loaded into routing table 122. Pages 174, 176, and 178 contain instructions to be loaded into routing table 132 for terminal 130.

In the described embodiment, each page has a maximum length defined by the size of its corresponding routing table. In the described embodiment, each routing table such and 122 and 132 contains multiple memory locations. In the illustrations herein, the each routing table is pictured containing a single page of instructions at a time. However, it may be desirable to simultaneously store multiple pages in a routing table at one time—for example to allow multithreading. Thus, each routing table may be partitioned into one or more page slots. This size of each page slot is a function of the total number of memory locations in the routing table and the number of page slots created. Each page preferably contains no more instructions than can be stored in a page slot at one time.

The number of instructions within each page may be further limited by the content of program 140. In the described embodiments, compiler 150 creates pages such that no page contains any instruction that is conditionally executed based on a different set of conditions than any other instruction within the page. For example, if program 140 includes an IF statement, all of the instructions that are executed when the IF statement is evaluated as true may be included on one page. That page does not, however, include any instructions that are conditionally executed when the IF statement evaluates to false. Instructions conditionally executed when the IF statement evaluates to false may be on a separate page. Further, neither page conditionally executed based on how the IF statement is evaluated includes any instructions that are executed prior to the IF statement in program 140. Thus, rules for parsing a program into pages may limit the size of each page.

Data dependencies may also limit the number of instructions in each page. The pages are created from regions, such as regions 160, 170, and 180. Each region is a group of instructions for which there are data dependencies. An instruction is included in a region if it generates a result used as an operand in another instruction in the region or uses as an operand a result generated by another instruction in the region. Stated conversely, when two regions are generated for the same terminal, there is no data dependency between the regions. Pages are created from regions. Accordingly, the number of instructions in a region may also impact the number of instructions in pages created from that region.

Figure 2:
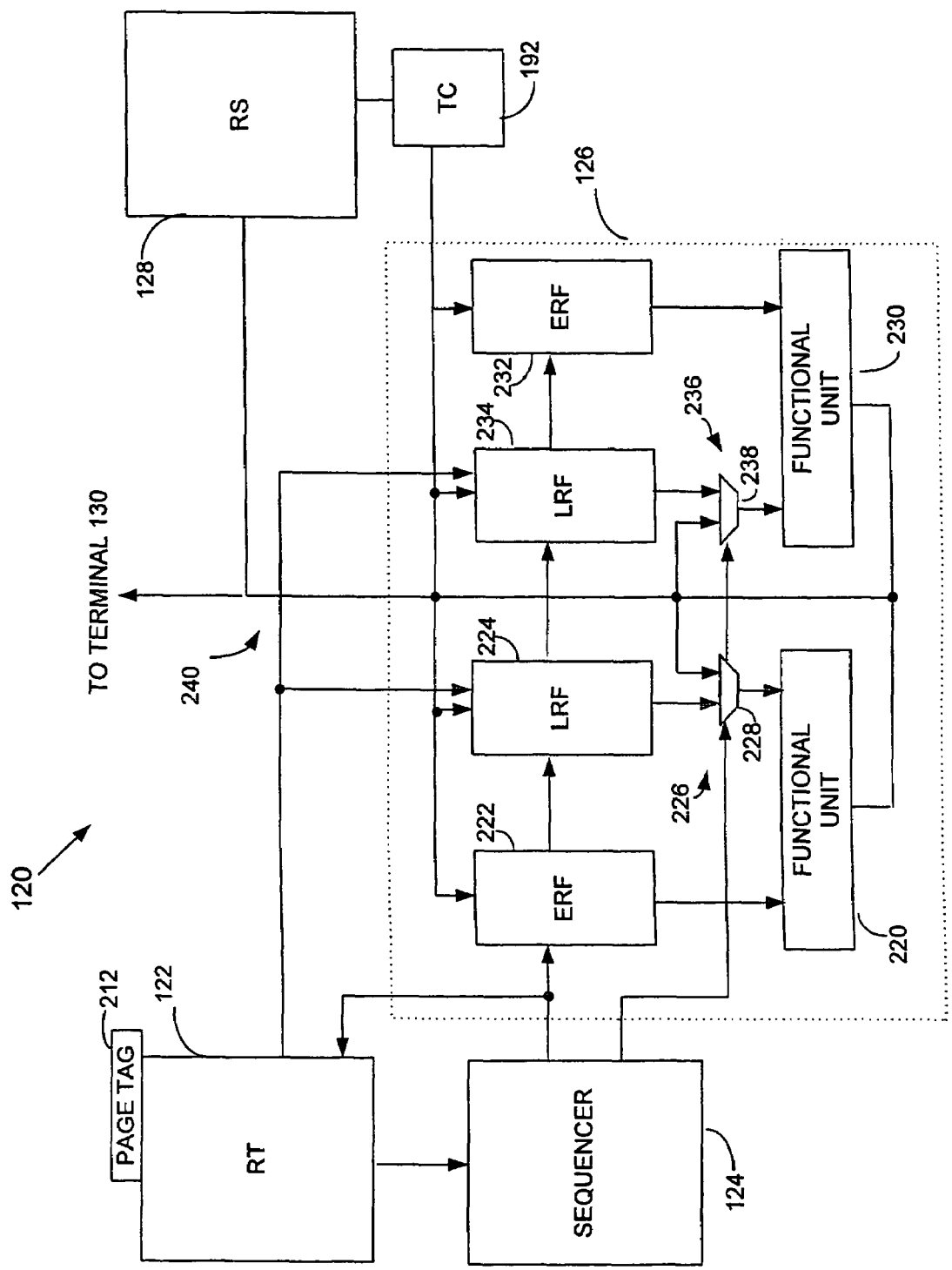
FIG. 2 is a block diagram of a terminal of the system of FIG. 1.

Turning to FIG. 2, additional details of terminal 120 are shown. In the illustrated embodiment, functional logic 126 includes two functional units 220 and 230. A functional unit may be any circuit or other structure that produces a result based on one or more operands applied to the functional unit. In embodiments where functional logic 126 evaluates arithmetic expressions, functional units 220 and 230 may each be a circuit that performs an arithmetic function. For example, functional unit 220 may be an adder and functional unit 230 may be a multiplier. Functional unit 220 and 230 may be constructed in any suitable way.

In the example of FIG. 2, two functional units are shown. This number of functional units is chosen for simplicity of illustration. Any number of functional units may be employed within functional logic 126. For example, three functional units may be employed, allowing functional logic to evaluate expressions containing addition, multiplication and division operations. The number and type of functional units contained within functional logic 126 is not a limitation of the invention. Preferably the number and type of functional units will be selected based on the types of operations required to efficiently execute programs that may be run processor system 110.

Here, each functional unit is shown to have two inputs. Each input provides one operand for the function evaluated by the functional unit. The operands are termed "early" and "late." "Early" operands are generated before an instruction has all the operands it requires for execution. A "late" operand is the last operand needed to execute an instruction that is made available to that instruction. When the late operand is available to an instruction the instruction is ready for execution.

Each input to each functional unit is shown to have a memory structure associated with it. In the example of FIG. 2, these memory structures are implemented as register files. Accordingly, functional unit 220 has register files 222 and 224 associated with its inputs. Functional unit 230 has register files 232 and 234 associated with its inputs. Register files 222 and 232 are "early" register files, storing early operands. Register files 224 and 234 are "late" register files, storing late operands.

Each of the register files 222, 224, 232, and 234 stores operands for its associated functional unit for use in executing instructions for the current page stored in routing table 122. As an example, in one embodiment routing table 122 is designed to store 256 instructions and each of the register files 222, 224, 232, and 234 is designed to have 8 locations.

In operation, each functional unit may evaluate one expression during each cycle of operation of terminal unit 120. As shown herein, each functional unit operates on two operands. The early operand for functional unit 220 comes from early register file 222. The second operand for functional unit 220 may be provided from late register file 224. Sequencer 214 controls which value is read from early register file 222 and late register file 220 and applied to the functional unit 220. The values selected provide operands for the same instruction. By selecting an instruction for which the late operand is in late register file 224, sequencer 124 may select ready instructions.

Alternatively, the second operand, the "late" operand, may be provided through bypass logic 226. Bypass logic 226 allows the output of a functional unit generated in one cycle to be used as an input in the next cycle. Bypass logic 226 is here shown to be implemented with a multiplexer 228 that couples the output of one of the functional units 220 or 230 to the late operand input of functional unit 220. Bypass logic 226 serves the same function of providing a late operand as a read from late register file 224, but can reduce the hardware requirements for the late register files by reducing the number of words that needs to be written simultaneously and the total amount of information that has to be stored in the register file at any time.

Functional unit 230 is likewise connected to an early register file 232 and a late register file of 234. The early register file 232 provides one of the operand inputs to functional unit 230. The second operand input to functional unit 230 may be derived either from late register file 232 or through bypass logic 236. Bypass logic 236 is here shown to be implemented with a multiplexer 238 coupling the outputs of one of the functional units such as 220 or 230 to the late operand input of functional unit 230.

Logic terminal 120 is here shown to include a data routing network such as 240. Data routing network 240 allows the result computed by each of the functional units to be routed to a data input of any of the register files 222, 224, 232 or 234. Data routing network 240 also allows the output of either functional unit to be routed to a receive station 128 or to a remote terminal, such as terminal 130 (FIG. 1).

Control circuitry, such as sequencer 124, within terminal 120 ensures that the desired early and late operands are applied to the appropriate functional units to execute instructions loaded in routing table 122. In addition, sequencer 124 ensures that results produced by the functional units are stored in the appropriate locations.

Other control logic also places operands within the register files 222, 224, 232 and 234. Here, transfer control logic 192 is shown connecting the receive station 128 to the register files. A page tag 212 is shown associated with the page loaded in routing table 122. Page tag 212 may be a memory location storing a digital value assigned to a specific page, such as by compiler 150 (FIG. 1). This value may be written into storage location 212 by loader 114 (FIG. 1) at the same time that a page is loaded into routing table 122. As is shown in greater detail in connection with FIG. 3B, each instruction may be identified in part by a page tag. Values stored in receive station 128 have associated with them page tags for the instructions that receive those values. Transfer control logic 192 reads those page tags from receive station 128 and compares them to the page tag 212. Transfer control logic 192 then moves values destined for instructions in routing table 122 into the appropriate register file such as 222, 224, 232 or 234. The specific register file selected as the destination for the move may be determined based on information stored in receive station 128 and in routing table 122.

Further details of terminal 130 are not expressly shown. Terminal 130 may operate similarly to terminal 120 with functional units appropriate to the functions performed by terminal 130 used in place of functional units 220 and 230. But, functional logic 136 need not have the same architecture as functional logic 126. Functional logic 136 may be constructed in any suitable way, including using architectures conventionally used to construct processors. In the described embodiment, terminal 130 includes a routing table 132 and a receive station 138. These components are used to exchange operands with terminal 120. Those circuits may have the same structure and/or function as the corresponding circuits in terminal 120. Alternatively, they may be simplified to perform only the functions required to provide an interface to terminal 120.

FIGS. 3A-3E give examples of the data structures that may be used to organize data stored in terminal 120. These data structures illustrate information from which sequencer 124 may determine which operands to apply to the functional units 220 and 230 and where the results of executing instructions within functional units 220 and 230 should be routed.

These data structures also illustrate information that transfer control logic 192 may use to select data to move from receive station 128.

FIG. 3A shows a page 300 as stored in routing table 212. Routing table 212 stores multiple instructions, here designated as $310_0, 310_1 \ldots 310_N$. Each of the instructions is stored at a particular offset relative to the start of the routing table. Here the offsets are indicated as $O_0, O_1 \ldots O_N$. The values of the offsets need not be stored in routing table 212. The offsets may be determined from addresses to routing table 212. For example, offset $O_0$ may represent the first address, offset $O_1$ may represent the second address, etc.

In the illustrated embodiment, the instructions stored at each of the offsets have the same format. Taking instruction $310_N$ as illustrative, multiple fields within the instruction are shown.

Field 320 is a flag that indicates whether the instruction $310_N$ has been executed. In one embodiment, this flag is set when loader 114 loads a new page into routing table 122. Sequencer 124 clears the valid flag 320 when instruction $310_N$ has been read twice—indicating that both early and late operands for the instruction have been generated. In this way, the valid flag may be used by sequencer 124 to determine which instructions in routing table 122 must be retained to provide additional information needed for execution. When the valid flag is cleared for every instruction in a page, the page slot associated with that page is made available to contain subsequent pages.

Fields $322_1, 322_2, 322_3$ and $322_4$ collectively make up the next expression list. Upon execution of instruction $310_N$, the results of executing the instruction are provided to child instructions. The next expression identifies these subsequent instructions. Here, the next expression list contains four entries, but any suitable number may be used.

All four of the fields in the next expression list need not contain addresses of actual instructions. If there are fewer than four child instructions for instruction $310_N$, some of the fields in the next expression list may be set to a code indicating a null address.

The format of an entry in the next expression list is shown in greater detail in FIG. 3B. FIG. 3B shows, as an example, next expression field $322_1$. In the instruction addressing scheme illustrated by FIG. 3B, fields 330, 332 and 334 are used to identify an instruction.

Field 330 identifies the terminal in which the addressed instruction will be executed. In the example of FIG. 1, two terminals, 120 and 130 are shown. Arithmetic instructions are executed in terminal 120. Therefore, the value in field 130 will identify terminal 120 for arithmetic instructions. Conversely, non-arithmetic instructions will contain a code indicating terminal 130 in field 330. Any suitable codes for identifying terminals may be used. In the described embodiment, the value in field 330 indicates whether the instruction addressed by next expression field $322_1$ for instruction $310_N$ is executed by the same terminal as instruction $310_N$. When the instruction pointed to by next expression field $322_1$ is executed in the same terminal as instruction $310_N$, the next expression is said to be "local." Accordingly, field 330 takes on the value of a "local" code. Conversely, when the next expression addressed by field $322_1$ is to be executed in a different terminal than instruction $310_N$, the referenced instruction is said to be "remote" and field 330 has the value of a "remote" code.

Field 332 in next expression field $322_1$ identifies the page in which the next expression occurs. As described above in connection FIG. 1, compiler 150 assigns page tags to each page as its created. Field 332 holds the tag for the page in which the addressed instruction appears.

Field 334 holds a value representing the offset of the instruction in that page. As shown in FIG. 3A, each instruction is assigned an offset from the start of the page. These three pieces of information—the terminal, the page and the offset within the page—fully identify one instruction.

Returning to FIG. 3A, the next field in instruction $310_N$ is the early address field 324. The contents of early address field 324 specify a location of the early operand for instruction $310_N$. When instruction $310_N$ is initially written to routing table 122, the early operand for the instruction is not yet computed. The value of the early operand for instruction $310_N$ is generated by executing other instructions within page 300 or by a transfer of information from receive station 128 into one of the early register files 222 or 232. The address at which the value is written into the register file is stored in early address field 324. Thus, the value in early address field is written to routing table 122 as page 300 is executed.

The value in field 326 may be used to determine whether a value destined as an operand for instruction 310N is an early operand. Before the early operand instruction for $310_N$ is available, field 326 has a value indicating that the early operand for instruction $310_N$ is unavailable. When page 300 is loaded into routing table 122, field 326 may be cleared for all instructions in page 300. As control logic, such as sequencer 124 or transfer control logic 192, stores a value in functional logic 126 as an operand for instruction $310_N$, the control logic sets field 326 to indicate that an early operand for instruction $310_N$ has been stored. If field 326 indicates the early operand for instruction $310_N$ has not previously been stored, an operand destined for that instruction will be treated as an early operand. Conversely, if field 326 indicates an early operand was previously stored, the operand destined for instruction $310_N$ will be treated as a late operand.

FIG. 3C indicates the format of a word 340 stored in an early register file. In this example, only the value of the early operand is stored in the early register file and word 340 has a single field.

Returning to FIG. 3A, the type field 328 in instruction $310_N$ indicates which functional unit will execute the instruction. The early register file corresponding to that functional unit is used to store the early operand. Thus, fields 324, 326 and 328 collectively specify whether and where the early operand for instruction $310_N$ is stored.

In the illustrated embodiment, each instruction has only 2 operands. Accordingly, only one early address field 324 is provided. If instructions have additional early operands, additional address fields could be provided.

In the embodiment illustrated, the address of the late operand is not stored in instruction $310_N$. In the described embodiment, information is read from routing table 122 and stored in the late register file, such as 224 or 234, in connection with the late operand. In this embodiment, the register files contain all information needed to execute any ready instruction and storing the late address in routing table 122 is unnecessary.

FIG. 3D shows an example of a word 350 that may be written into a location of a late register file when the late operand for instruction $310_N$ is generated. Field 352 indicates that the location contains valid data representing a late value.

Late value field 354 contains the value of the late operand.

Field 356 indicates the address in the early register file of the early operand for the corresponding instruction. In use, when late operand is generated by an instruction indicating that instruction $310_N$ is one of its child instructions, instruction $310_N$ is read from routing table 122. Field 356 takes on the early address value stored in early address field 324 associated with instruction $310_N$.

Other information necessary to execute instruction $310_N$ is also copied to the late register file from routing table 122. The copied information includes the next expression list indicating where the results of that instruction are to be routed. Accordingly, word 350 contains fields $358_1$, $358_2$, $358_3$, and $358_4$. These fields may contain copies of the values in fields $322_1$, $322_2$, $322_3$ and $322_4$ contained within instruction $310_N$.

As the values of field 354, 356 and $358_1 \ldots 358_4$ are populated with appropriate data, validity bit 352 may be set to a state indicating that word 350 contains valid information. When valid information is contained in a word in a late register file such as 224 or 234, the instruction is ready for execution.

Sequencer 124 can monitor the validity field 352 in each of the words in late register files 224 and 234. Each cycle, one of those words may be selected to provide the late operand for an instruction to the corresponding functional unit. The early address in field 356 of the selected word allows sequencer 124 to identify the location of the early operand for that instruction. In this way, both the early and late operands may be identified and applied to the appropriate functional unit. The result generated by that functional unit may then be distributed to the child operations locations identified in the next expression list contained in fields $358_1 \ldots 358_4$. Upon execution of the instruction, the validity field 352 may be cleared, indicating that the location in the late register file no longer contains data representing an instruction to be executed.

Each next expression field such as $358_1 \ldots 358_4$ may identify an address for a child instruction. A physical destination for the result computed upon execution of that instruction may be determined but may depend on where and when the child instruction will be executed. The process by which the destination is selected is described in greater detail in connection with FIG. 4C, below. However, one possible destination is a receive station 128 or 138. When information is transmitted to receive station 128 or receive station 138, the information is transmitted in a word in the format of word 360 shown in FIG. 3E.

Word 360 has a value field 362. The instructions that are the destinations for that value are contained within the next expression list within word 360. Here, the next expression list contains next expression fields $364_1$, $364_2$, $364_3$ and $364_4$. These fields may identify instructions by terminal, page and offset as described above in connection with FIG. 3B.

Turning now to FIG. 4A, a flow chart of the operation of one cycle of the operation of terminal 120 is shown. Each cycle is shown to include four phases. The dispatch phase is shown as block 410. During the dispatch phase, operands are selected from the register files.

The next phase of the operation is shown at block 412. Block 412 illustrates the execute phase. During the execute phase, the functional units such as 220 and 230 perform their intended operations to generate results. The specific processing performed in execute phase 412 depends on the desired operation of each of the functional units.

The next phase of a cycle occurs at block 414. Block 414 represents the "decide routing" phase. In the decide routing phase, the destination or destinations for the results computed in the execute phase are determined.

The next phase of the cycle is performed at block 416. Block 416 represents the write phase. During the write phase, the result computed during the execute phase (block 412) is written to the locations determined during the decide routing phase (block 414).

The dispatch phase in block 410 is shown in greater detail in FIG. 4B. The dispatch phase 410 begins at decision block 422. At decision block 422, the process steps are altered based on whether a value computed as a result of the execute phase in the prior cycle is a late operand. If the computed value is a late operand, it signifies that some instruction stored in routing table 122 has all of the operands it needs for execution. Therefore, the output of the functional unit that generated the late operand in the last cycle may be coupled directly to the late input of a functional unit.

When a late operand is available at the output of one functional unit, execution proceeds to block 424. At 424, the bypass network, either 226 or 236, is configured to route the output of the functional unit to the late input of the functional unit. The specific connections are determined during the decide routing phase (block 448, FIG. 4C) in the prior instruction cycle.

Execution then proceeds to block 426. At block 426 the address for the early operand corresponding to the instruction to be executed is determined. Where the result of one instruction is a late operand routed through the bypass network without being stored in the late register file, the address of the early operand corresponding to the same instruction as to that late operand can be obtained from routing table 122, such as by reading early address field 324 in the appropriate instruction. This value may also be read as part of the decide routing phase (block 414) of the prior cycle.

When decision block 422 determines that the value generated in the prior cycle is not a late value, execution proceeds to block 428. At block 428, a late value is read from the late register file. Words in a late register file that store valid late values have their validity field 352 set. Sequencer 124 may select in any suitable way a word in the late register file with validity field 352 set.

Execution proceeds to block 430. Where the value is read from the late register file, the address for the early operand will be stored in the word read from the late register file. For example, FIG. 3D shows field 356 containing the early address.

Regardless of whether the address for the early operand is determined at block 426 or 430, execution proceeds to block 432. At block 432 the determined address for the early value is used to read the value of the early operand from the early register file. Once the value of the early operand and the late operand are determined, the dispatch phase ends.

FIG. 4B shows the dispatch phase performed once per cycle. Functional units 220 and 230 may be designed to operate independently. Accordingly, each may perform one operation in each cycle. Where multiple functional units are designed to operate during the same cycle, the dispatch phase may be performed once for each functional unit in each cycle. Likewise, the other phases illustrated in FIG. 4A may also be performed once per cycle per functional unit.

Figure 4C:
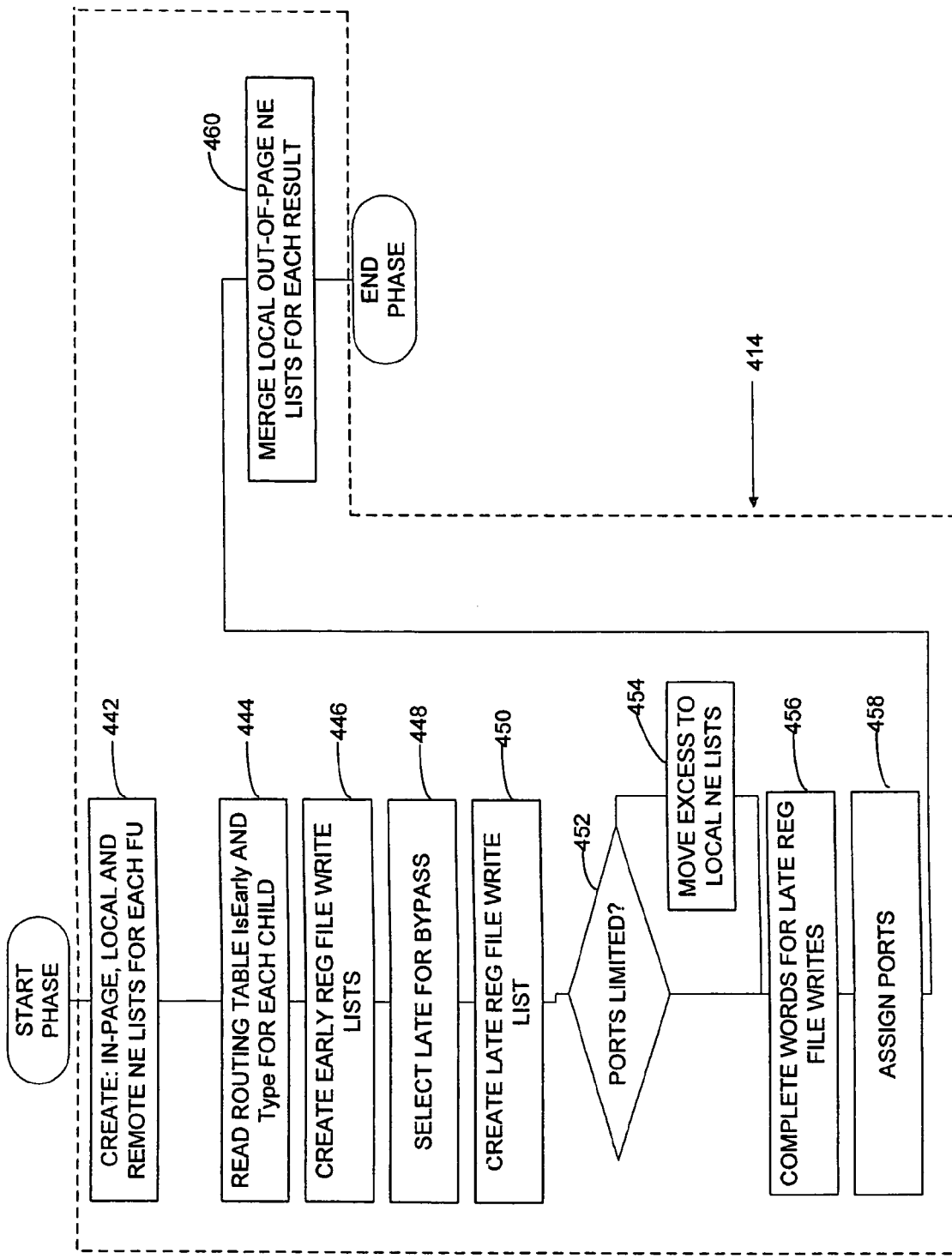
FIG. 4C is a flow chart showing in greater detail the decide routing phase of FIG. 4A.

Turning to FIG. 4C the decide routing phase (block 414) is shown in greater detail. Where multiple functional units each generate a result during a cycle, multiple values may need to be routed. Further, each value may need to be routed to multiple destinations. The processing illustrated in FIG. 4C may be used to determine the routing of all values.

The decide routing phase begins at block 442. In the embodiment shown in FIG. 2, each result may be written to three possible locations. Results destined for use by instructions contained within the page currently loaded in routing table 122 are considered to generate "in page" writes. Where possible, these values are written into one of the register files contained within functional logic 126. Values destined for use by instructions to be executed in terminal 120 but are not contained within the page currently loaded in routing table 122 are considered to generate "local" writes. Local writes are destined for receive station 128. Values destined for use as operands of instructions to be executed in terminal 130 are considered to generate "remote" writes. Remote writes are destined for writes in receive station 138. At step 442 the next expression lists associated with the instructions executed in each of the functional units are reformatted into lists based on where the operands for those expressions are written. In-page, local and remote next expression lists may be created for the output of each functional unit. Each list contains a list of child instructions for which in page, local, and remote writes, respectively are generated.

The in-page list must be further segmented to indicate which of the register files is to receive the value. Each functional unit has its own set of register files associated with it. Each set of register files includes an early and a late register file. The in-page next expression lists may be created by reading the entries in the routing table corresponding to the child instruction. Field 326 of the child instruction indicates whether the value is to be written in a early register file such as 222 or 232 or in a late register file such as 224 or 234. By reading the type field 328, the specific register file may be identified. A value in type field 328 of the child instruction indicating the instruction is to be executed in functional unit 220 indicates the value should be written into register 222 or 224. Conversely, a value in the type field 328 indicating the instruction is to be executed in functional unit 230 indicates the value should be written into register 232 or 234.

At block 446 the information gathered at block 444 may be used to create a write list for each early register file. The write list includes an entry identifying each value to be written in that early register file.

As described above in connection with decision block 422 (FIG. 4B), when a late operand is generated in one cycle, it may be used as the late operand input to a functional unit in the next cycle. In block 448, one instruction for which a late operand is generated is selected for execution in the next cycle. The late operand for that instruction is selected at block 448 for routing through the bypass network. Where the late operand is an operand for an instruction to be executed by functional unit 220, the late operand is routed through bypass network 226. When the operand is destined for an instruction to be executed by functional unit 230, the result is routed through bypass network 236. One late operand for each functional unit may be selected at block 448.

At block 450, lists of all of the writes for late operands, excluding those selected for bypass at block 448, are created. As described above, information read from the child expression identifies which operands are late operands and also the functional unit with which those operands are associated.

The lists of values to be written into each of the register files is then used at decision block 452. Each register file may have a limited number of ports, reflecting the total number of values that may be written to that register file during one cycle. If, for any of the register files such as 222, 224, 232, or 234 the number of writes on the write list exceeds the number of ports, processing proceeds to block 454.

At block 454, writes on the list that would cause the number of writes to any register file to exceed the number of ports are moved to the list of local writes. Values on the list of local writes are written to the receive station in the local terminal where they are temporarily stored. They may be moved to the register file by transfer control logic 192 when possible.

Processing proceeds to block 456. At block 456 the words to be written into each late register file are completed. As shown above in connection with FIG. 3D, an early address value and a next expression list is filled in for a word 350 written to a late register file. The values for these fields are determined from the information stored in routing table 122 for the instruction with which the operand is associated.

At block 458, each entry remaining on the in-page list is mapped to a write port for a specific register file.

At block 460 the local write list created at block 442 is merged with any excess write values determined at block 454. The merged results take the form of word 360 illustrated in FIG. 3E. The lists are merged by including the address for each instruction in the next expression list of word 360.

By the end of the phase, multiple values to be written may have been generated. The value generated by each functional unit may give rise to one or more of the following:
- an early value word in a form of word 340 (FIG. 3C) for each early register file, with a list of ports in the corresponding early register file through which that value should be written.
- a word in the form of word 350 (FIG. 3D) for each late register file with a list of ports in the corresponding late register file through which that word should be written.
- a word in the form of word 360 that may be written to remote station 128 on the local terminal.
- a word, also in the form of word 360, that may be written to the receive station 138 in the remote terminal 130.

At block 416 (FIG. 4A), each of these values is written in the appropriate memory location. In a contemplated embodiment, each of the writes occurs simultaneously. However, any suitable process for writing values may be used.

Figure 5:
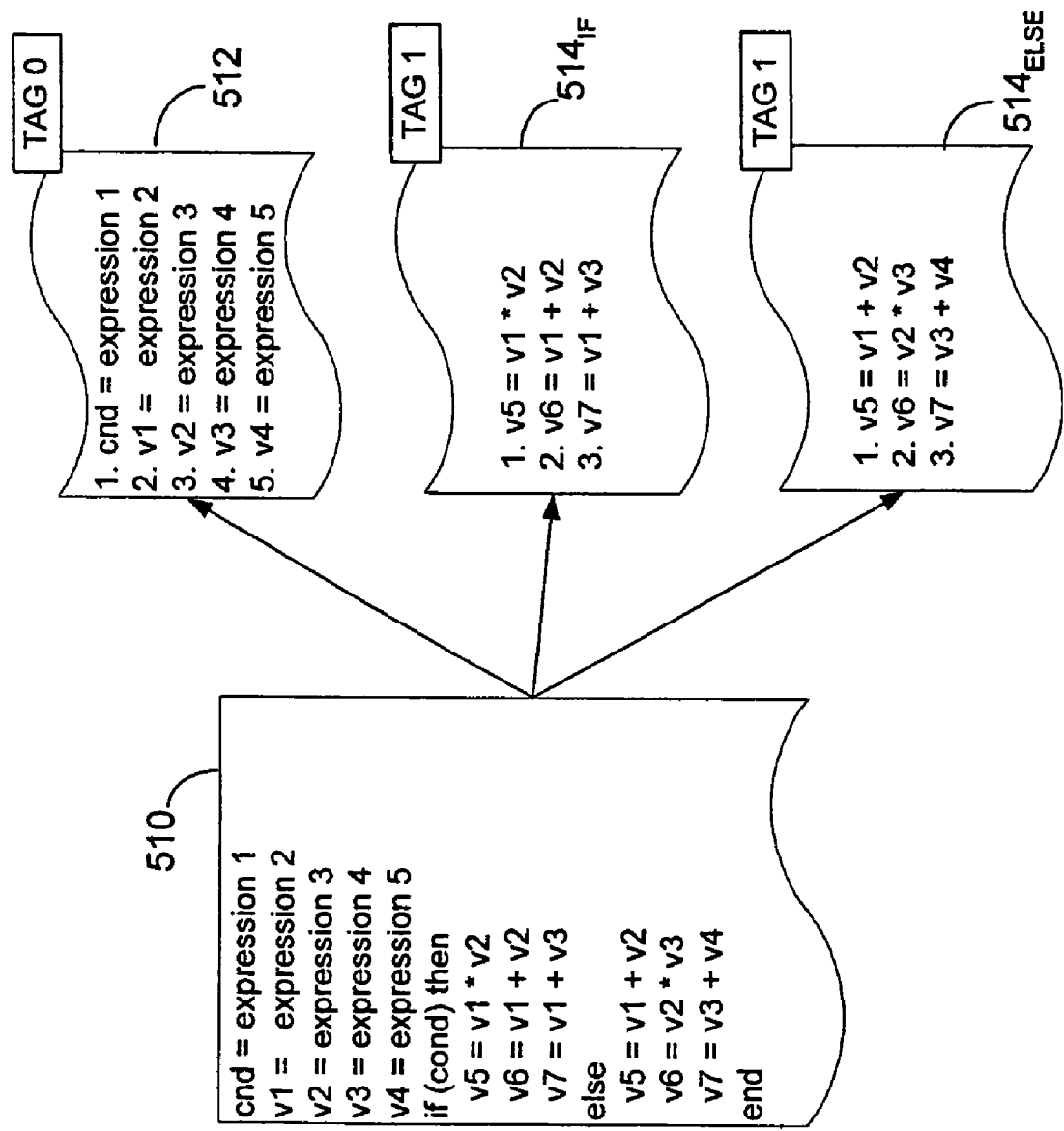
FIG. 5 is a sketch useful in understanding parsing of conditional expressions into pages.

Turning now to FIG. 5, an example implementation of a process for executing a conditional statement by a system such as shown in FIG. 1 is illustrated. FIG. 5 shows a block 510 of code such as may be contained within program 140 (FIG. 1). Compiler 150 translates this code into three separate pages. Page 512 contains the five expressions that precede the IF statement in block 510 of code. Page $514_{1F}$ includes the three expressions that are executed when the IF statement evaluates as true. Page $514_{ELSE}$ contains the three instructions that are executed when the IF statement evaluates as false. Three separate pages are used to group on the same page instructions executed under the set of conditions.

When executing block 510 of code, loader 114 will load page 512 into routing table 122. Here page 512 is shown to be given a page identifier of TAG 0.

In the illustrated embodiment, loader 114 is constructed to perform conditional operations. In particular, it is programmed to load either page $514_{1F}$ or $514_{ELSE}$ based on the evaluation of the IF statement contained within block 510 of code. Accordingly, either page $514_{1F}$ or page $514_{ELSE}$ will be loaded after page 512. Here, both pages $514_{1F}$ and page $514_{ELSE}$ are given a page identifier of TAG 1. In this embodiment, instructions within page 512, or any other page, may provide operands to child instructions in either page $514_{1F}$ or page $514_{ELSE}$ by using the page tag, TAG 1, in the "next expression lists."

FIGS. 6A and 6B indicate a problem that can arise if two pages are mapped to the same page identifier without taking additional steps to direct results to the desired instructions. FIG. 6A represents a mapping $614_{1F}$ between results generated in page 512 and the instructions within page $514_{1F}$. The first instruction in page $514_{1F}$ uses as operands values $V_1$ and $V_2$. The second instruction within page $514_{1F}$ uses values $V_1$ and $V_2$. The third instruction uses values $V_1$ and $V_3$. This correspondence between instructions and values is shown by X's in mapping $614_{1F}$ In page $514_{ELSE}$, the first instruction also uses values $V_1$ and $V_2$. These are the same operands used for instruction of page $514_{IF}$. Instruction 1 in page $514_{1F}$ or page $514_{ELSE}$ will receive the correct operands, regardless of which page is loaded. However, instructions 2 and 3 in page $514_{ESLE}$ uses different operands than the corresponding instructions in page $514_{1F}$. The second instruction on page $514_{ELSE}$ uses value $V_3$ instead of $V_1$ as an operand. The third instruction on page $514_{ELSE}$ uses value $V_4$ as an operand instead of $V_1$. This correspondence between instructions and values is shown by X's in mapping $614_{ELSE}$. FIG. 6A indicates by a circle around an "X" a situation where the desired operand depends on which page is loaded. Accordingly, the correct destinations for the operands for the second or third instruction of page $514_{1F}$ or $514_{ELSE}$ cannot be described using page/offset addressing until after the IF statement is evaluated and a determination is made as to which of the pages will be loaded. This scenario creates a problem in the described embodiments because the destinations may need to be determined and operands stored before the IF statement is evaluated.

FIG. 6C shows one possible solution that allows the destinations for operands to be determined before it is known which page will be loaded upon evaluation of the IF statement. Each instruction in mapping $614_{IF'}$ receives the same operands as the corresponding instruction in mapping $614_{ELSE'}$. Two new pages $514_{1F'}$ and $514_{ELSE'}$ as shown in FIGS. 6D and 6E are created. Page $514_{ELSE'}$ includes the same instructions as $514_{ELSE}$. However, NOP instructions have been inserted at every offset in the page in which the instruction in page $514_{ELSE}$ does not use the same operands as the corresponding instruction in page $514_{1F}$. The NOP instructions are not executed and improper results do not occur regardless of which operands they receive. In this way, page $514_{ELSE'}$ is made longer but each instruction that is executed receives the appropriate operands.

Making page $514_{ELSE'}$ longer means that results may be directed to child instructions that do not exist within page $514_{1F}$. To avoid unintended operating states resulting from attempts to apply operands at offsets for which no valid instructions are stored, page $514_{1F}$ is padded with NOP instructions to create page $514_{1F'}$, having the same number of instructions as page $514_{ELSE'}$.

NOP instructions may be simply implemented by having loader 114 or other suitable control circuitry set the valid field 320 of the instruction indicating that the instructions should not be executed.

The specific hardware used to implement processor system 110 is not critical to the invention. For high speed operation, it may be desirable to implement the hardware of processor 110 using high speed digital logic design techniques, whether now known or hereafter developed. Design techniques such as pipelining may be used. For example, functional logic 126 could be selecting new operands to apply to a functional unit while that functional unit is computing the result from operands applied in a prior instruction. With appropriate design, such as the inclusion of pipeline registers, inputs to other stages can be selected while results from prior operands are being processed in other stages.

Further, the circuitry may be implemented to allow multithreading. For example, by allowing asynchronous transfers from one terminal into the receive station of another terminal, the terminals may execute their programs relatively autonomously, exchanging data when necessary. By dividing the programs into regions with no interactions between regions, regions may be loaded into separate terminals and executed at any convenient time. Multithreading is also enabled by having multiple pages loaded into the routing table at one time. The pages that are loaded into the routing table may correspond to pages of different tasks, allowing simultaneous execution of tasks.

Having thus described several aspects of at least one embodiment of this invention, it is to be appreciated various alterations, modifications, and improvements will readily occur to those skilled in the art.

For example, the it is described above that pages of instructions are loaded from program memory 112 into a routing table, such as 122 or 132. The pages of instructions need not be physically copied from one memory to another. Rather, moving instructions into the routing table could be done virtually, such as by using a pointer or other memory structure to associate a page stored in program memory 112 with one of the page slots in the routing table.

Any suitable memory structure or structures may be used to store the desired information. A further variation may be to construct a routing table that contains only those fields that are altered as instructions on a page are executed. For example, FIG. 3A shows fields 320, 324 and 326 that are updated as instructions are executed. The additional information in pictured in FIG. 3A that is used in executing a page may remain stored in a program memory, such as memory 112.

As a further example, specific designs for the components described above are not critical for the invention. As specific examples, program memory 112 and data memory 116 could be SRAM or DRAM or any other type of memory compatible with processor system 110. The memories could be implemented on the same chip as the rest of the processor system 110 or on separate chips. As a further variation, each memory could be implemented with multiple components, each using different technologies and residing in different places. For example, some portion of each of program memory 112 and data memory 116 could be implemented as a high speed on-chip memory, such as a cache or a buffer, while the remaining portion could be implemented as a lower speed off-chip memory. In the buffer scenario, as each page is transferred from the high speed on-chip memory to a terminal, another page may be loaded from the lower speed off-chip memory to replace it.

Sequencer 214 need not be a specific logic section within the processor system 110. It may be logic distributed throughout the terminal unit controlling its operation. Further, sequencer 214 may be connected to other components or connected to the illustrated components in other ways than illustrated. Interconnections between control logic such as sequencer 214 and the logic that it controls are known in the art and has been omitted for simplicity.

Examples of addressing schemes are given above. These are for illustration only. An address could be any code or other means to identify a location where information is stored. For example, it is described that addresses within the routing table are specified as absolute addresses. Absolute addressing allows the same address format to be used to address entries regardless of whether they are in the routing table, the receive station of the terminal containing the routing table in which the entry is made or the receive station of a different terminal. Relative addressing could be used to allow addresses referring to entries within the same page as the entry using that address to be specified in a different format. Relative addressing could allow faster access.

Likewise, pages of expressions are identified by tags. In the examples given, each tag is a digital value. Any suitable method of identifying pages or other groupings of instructions may be used as a tag.

As a further variation, it is described that each instruction has two operands. It is not necessary that each instruction have two operands. Different terminals could be constructed to execute instructions with different numbers of operands. For example, multiple early instruction register files may be used to implement functional units that execute instructions requiring more than two operations. A corresponding number of early register address fields may be included in the routing table. Nor is it necessary that all instructions have the same number of operands. As one example, instructions with a reduced number of operands could be implemented by marking the data table associated with those instructions to indicate that values have already been generated for any unused early operands.

Also, each entry in a next expression list is pictured as having a field identifying whether the next expression is local or remote. A single bit may be used for this field when there is only one remote terminal. Where multiple remote terminals are used, multiple bits may be used in this field to further identify which remote terminal contains the next expression.

Such alterations, modifications, and improvements are intended to be part of this disclosure, and are intended to be within the spirit and scope of the invention. Accordingly, the foregoing description and drawings are by way of example only.

What is claimed is:

1. A method of operating a processor to execute a plurality of instructions, each instruction operating on at least one operand associated with the instruction, the method comprising:
   loading a first page comprising a first portion of the plurality of instructions;
   evaluating a condition following execution of the first portion of the plurality of instructions and selectively loading one of a second page or a third page based on the evaluating, each of the second and third page being identified by a same common tag value, and wherein:
   instructions at corresponding offsets in the second and third pages operate on the same operands; and
   executing the first portion of the plurality of instructions comprises:
   a) executing a first instruction in the first portion of the plurality of instructions to generate a first result;
   b) prior to selectively loading the second page or the third page, buffering the first result with an indication that it is an operand for an instruction at an offset within a page having the common tag value;
   c) upon selectively loading the second page or the third page, making the first result available to a child instruction at the offset in the selectively loaded one of the second page or the third page by transferring the first result from the buffer to a location associated with the offset;
   d) selecting the child instruction on the page that is selectively loaded as a second instruction; and
   e) when the second instruction uses an operand, executing the second instruction using the first result as an operand,
   whereby the first result can be buffered for use in execution of an instruction in a second page or a third page that is conditionally loaded before an evaluation of a condition indicating whether to selectively load the second page or the third page.

2. The method of claim 1, wherein the processor comprises at least one functional unit having at least two inputs, and (i) executing the first instruction comprises applying the at least one operand associated with the first instruction to inputs of the functional unit and (ii) executing the second instruction when the second instruction uses an operand comprises applying the at least one operand associated with the second instruction to inputs of the functional unit; and (iii) when the second instruction is a NOP that does not use an operand, the method further comprises executing the second instruction.

3. The method of claim 2, wherein the at least one operand consists of two operands and selecting an instruction comprises selecting an instruction from a memory structure storing instructions for which operands of the instruction have been made available to the instruction.

4. The method of claim 2, wherein:
   the processor comprises a plurality of register files, each coupled to an input of the functional unit, and
   the act of making the result available to at least one other instruction comprises storing the result in a register in a register file of a plurality of register files.

5. The method of claim 4, wherein:
   a) the register has an address associated therewith; and
   b) making the result available to at least one other instruction further comprises making an entry in a field in the at least one other instruction indicating said address.

6. The method of claim 2, wherein:
   a) the at least one functional unit comprises at least a first functional unit executing a first type function and second functional unit executing a second type function, each functional unit having at least one memory structure associated therewith;
   b) each of the plurality of instructions has a type associated therewith; and
   c) making the result available to an instruction comprises storing the result in a memory structure associated with a functional unit having associated therewith the same type as the type of the instruction.

7. The method of claim 6, wherein the method additionally comprises simultaneously executing selected ones of the plurality of instructions with the first functional unit and second functional unit.

8. The method of claim 1, wherein executing the second instruction comprises executing an arithmetic operation with the at least one operand of the second instruction.

9. The method of claim 1, wherein the first instruction has a plurality of fields, each field having a value, and making the result available to at least one other of the plurality of instructions comprises selecting the at least one other of the plurality of instructions based on the value in at least one of the plurality of fields in the first instruction.

10. A method of operating a processor to execute a plurality of instructions, each instruction having at least a first and a last operand associated therewith, the method comprising:
   a) loading a memory structure with the plurality of instructions, each of the plurality of instructions comprising a child instruction field adapted to store an indication of a child instruction to receive a result of the instruction and a field adapted to store an indication of a location of an operand;
   b) applying a plurality of operands to a functional unit based on a first instruction of the plurality of instructions to generate a first result, the functional unit having at least first and second inputs;
   c) identifying a second instruction based on a value of the child instruction field of the first instruction, the second instruction having at least a first and a last operand to be associated therewith and requiring the first result as an operand;
   d) when the first result is the first operand to be associated with the second instruction, storing the first result in a location of a first memory coupled to the first input of the functional unit and storing an indication of the location in the first memory in a field of the memory structure adapted to store the indication of the location of an operand associated with the second instruction; and e) when the first result is the last operand to be associated with the second instruction, storing the first result in a location of a second memory coupled to the second input of the functional unit, and copying, from a location in the memory structure associated with the second instruction, a value indicating a location in the first memory of an operand of the second instruction, said value being copied into the location of the second memory, thereby associating the location in the first memory storing a first operand of the second instruction with the location in the second memory storing a second operand of the second instruction.

11. The method of claim 10, further comprising, executing the second instruction based on information in the first and second memories by:

applying to the first input of the functional unit the first operand from the first memory, and applying to the second input of the functional unit the second operand from the second memory.

12. The method of claim 11, wherein the first memory comprises a first register file and the second memory comprises a second register file.

13. The method of claim 11, further comprising, in response to the copying the value from the location in the memory structure associated with second instruction, storing an indication in the memory structure that the second instruction has been processed.

14. The method of claim 13, wherein:

the plurality of instructions comprises a first plurality of instructions; and the method further comprising, upon a determination that all of the first plurality of instructions has been indicated in the memory structure as processed, loading a second plurality of instructions into the memory structure.

15. The method of claim 10, wherein the copying further comprises copying from the location in the memory structure associated with the second instruction to the location of the second memory-an indicator of at least one instruction requiring a result of executing the second instruction.

16. The method of claim 15, wherein storing an indicator of at least one instruction requiring the result of executing the second instruction comprises reading a value indicating at least one instruction requiring the result from a field in the second instruction and storing that value as the indicator.

17. The method of claim 10, additionally comprising, upon execution of all of the plurality of instructions loaded into the memory structure, replacing the plurality of instructions with a second plurality of instructions in the memory structure.

18. The method of claim 10, wherein the first memory is a first register file associated with the functional unit.

19. The method of claim 18, wherein the second memory is a second register file associated with the functional unit.

20. The method of operating a processor of claim 10, wherein identifying a second instruction comprises identifying a plurality of second instructions requiring the result as an operand.

21. The method of claim 20, wherein storing the result in the location of the first memory and storing the indication of the location comprises simultaneously storing the indication associated with more than one of the plurality of second instructions.

22. The method of claim 21, wherein:

a) the location in the first memory has an address; and b) simultaneously storing the indication associated with the more than one of the plurality of second instructions comprises writing the address of the location in the first memory to an instruction memory structure a plurality of times, each writing being associated with an instruction of the more than one of the plurality of second instructions.

23. The method of claim 22, further comprising associating the result with a second portion of the plurality of second instructions by storing the result in a memory structure and associating therewith indicators of the instructions in the second portion of the plurality of second instructions.

24. The method of claim 23, wherein the act of associating the result with a second portion of the plurality of second instructions comprises associating the result with instructions in the second portion of the plurality of second instructions that are loaded in the instruction memory.

25. The method of claim 23, wherein the act of associating the result with a second portion of the plurality of second instructions comprises associating the result with instructions in the second portion of the plurality of second instructions that are not then loaded in the instruction memory.

26. The method of claim 23, wherein the processor has a second functional unit and a second instruction memory associated therewith and the act of associating the result with a second portion of the plurality of second instructions comprises associating the result with instructions in the second portion of the plurality of second instructions intended to be loaded in the second instruction memory for execution by the second functional unit.

27. A method of operating a processor of the type having a plurality of terminals comprising at least a first terminal and a second terminal, each of the plurality of terminals comprising: (i) functional logic having inputs, the functional logic producing a result based on operands applied to the inputs; (ii) operand storage memory; (iii) an instruction store; and (iv) a transfer memory, the transfer memory of the first terminal being adapted to receive a result of an operation in the second terminal and the transfer memory of the second terminal being adapted to receive a result of an operation in the first terminal, the method comprising:

a) at a first time, loading into the instruction store of the first terminal a first plurality of instructions having a first tag associated therewith, each instruction representative of an expression and containing an indication of a subsequent instruction that uses as an operand the result produced upon evaluation of the expression;

b) evaluating, with the functional logic of the first terminal, an expression based on a first instruction in the instruction store to generate a first result; and c) using the indication of a subsequent instruction loaded into the instruction store as part of the first instruction to select a destination for the result, wherein:

i) the destination is at least one of the operand storage memory of the first terminal, the transfer memory of the first terminal, the transfer memory of the second terminal and an input of the functional logic of the first terminal;

ii) the indication of the subsequent instruction includes a subsequent instruction tag; and iii) selecting a destination comprises selecting as the at least one destination:

the transfer memory of the second terminal when the subsequent instruction tag is a second tag, different than the first tag, the second tag being associated with the instruction store of the second terminal;

the operand store of the first terminal when the subsequent instruction tag is the same as the first tag and the operand store of the first terminal can accept the operand; and the transfer memory of the first terminal when the subsequent instruction tag is the same as the first tag and the operand store of the first terminal cannot accept the operand.

28. The method of operating a processor of claim 27, wherein selecting the destination further comprises selecting as the at least one destination the transfer memory of the first terminal when the subsequent instruction tag is a second tag, different than the first tag, and the second tag is not associated with any of the plurality of terminals.

29. The method of operating a processor of claim 28, additionally comprising:

at a second time, loading into the instruction store of the first terminal a second plurality of instructions having the second tag associated therewith; and when the selected destination is the transfer memory of the first terminal, following the second time, transferring the first result from the transfer memory of the first terminal to the operand store of the first terminal and evaluating with the functional logic an expression based on an instruction of the second plurality of instruction using the first result.

30. The method of operating a processor of claim 27, wherein both the operand storage memory of the first terminal and an input of the functional logic of the first terminal are selected as a destination when the subsequent expression tag is the same as the first tag.

31. The method of operating a processor of claim 27, further comprising:

a) evaluating with the functional logic in the first terminal an expression based on a second instruction in the instruction store of the first terminal to generate a second result; and b) storing the second result in the transfer memory of the second terminal.

32. The method of operating a processor of claim 31, additionally comprising storing an instruction address in the transfer memory of the second terminal associated with the second result.

33. The method of operating a processor of claim 32, comprising executing with the second terminal an instruction identified with the stored address, wherein executing the instruction includes using the second result as an operand.

34. A computer readable medium having stored thereon a data structure comprising a plurality of entries, each entry representing an expression to be evaluated by functional logic of a processor having a plurality of terminals with different functional logic to produce a result, and each entry comprising:

a plurality of child expression fields, each child expression field for storing an indication of an entry in the data structure representing an expression that requires the result as an operand;

an early operand address field for storing an address of an early operand;

a field for storing an indication of the type of operation to be performed to evaluate the expression;

an early operand flag for storing an indication of whether an early operand has been stored; and a valid flag for storing an indication of whether the expression has been evaluated, wherein the data structure is partitioned into pages, each page comprising a tag identifying the page and each of the plurality of entries in each page comprising a value in the field for storing an indication of the type that identifies an operation performed by the functional logic of the same terminal of the plurality of terminals.

35. The computer readable medium of claim 34, wherein each entry additionally comprises a type field indicating the type of operation performed by the functional logic in evaluating the expression represented by the entry.

36. The computer readable medium of claim 34, wherein the field indicating whether the expression has been evaluated is a boolean field.

* * * * *